US012665134B2

(12) United States Patent　　　　(10) Patent No.: US 12,665,134 B2
Isota et al.　　　　　　　　　　　　　(45) Date of Patent:　Jun. 23, 2026

(54) MULTILAYER CERAMIC CAPACITOR

(71) Applicant: Murata Manufacturing Co., Ltd., Nagaokakyo (JP)

(72) Inventors: Shinya Isota, Nagaokakyo (JP); Yuta Oshima, Nagaokakyo (JP); Hideyuki Hashimoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 253 days.

(21) Appl. No.: 18/423,457

(22) Filed: Jan. 26, 2024

(65) Prior Publication Data

US 2024/0170220 A1　　May 23, 2024

Related U.S. Application Data

(63) Continuation of application No. PCT/JP2022/035978, filed on Sep. 27, 2022.

(30) Foreign Application Priority Data

Sep. 30, 2021　(JP) ................................. 2021-161109

(51) Int. Cl.
　H01G 4/30　　　　(2006.01)
　H01G 4/008　　　(2006.01)
　　　　(Continued)

(52) U.S. Cl.
　CPC ............... H01G 4/30 (2013.01); H01G 4/008 (2013.01); H01G 4/012 (2013.01); H01G 4/232 (2013.01); H01G 4/12 (2013.01)

(58) Field of Classification Search
　CPC .......... H01G 4/30; H01G 4/008; H01G 4/012; H01G 4/232; H01G 4/12
　See application file for complete search history.

(56) References Cited

U.S. PATENT DOCUMENTS

2002/0013213 A1　1/2002　Sato et al.
2008/0266751 A1*　10/2008　Yamazaki ......... C04B 35/62815
　　　　　　　　　　　　　　　　361/321.4

(Continued)

FOREIGN PATENT DOCUMENTS

JP　　2002080275 A　　3/2002
JP　　2017178686 A　　10/2017
　　　　(Continued)

OTHER PUBLICATIONS

International Search Report in PCT/JP2022/035978, mailed Dec. 20, 2022, 3 pages.

(Continued)

*Primary Examiner* — Michael P McFadden
(74) *Attorney, Agent, or Firm* — Keating & Bennett, LLP

(57)　　　　　　ABSTRACT

A multilayer ceramic capacitor includes a multilayer body including first and second main surfaces opposite to each other in a thickness direction, first and second side surfaces opposite to each other in a width direction, and first and second end surfaces opposite to each other in a length direction, the multilayer body including dielectric layers and inner electrode layers laminated in the thickness direction, and a pair of outer electrodes on the first and second end surfaces and connected to the inner electrode layers. The dielectric layers include dielectric particles. The multilayer body includes a layered first side portion, a layered second side portion, a first outer layer portion, a second outer layer portion, and an inner layer portion.

15 Claims, 4 Drawing Sheets

(51) Int. Cl.
  H01G 4/012 (2006.01)
  H01G 4/12 (2006.01)
  H01G 4/232 (2006.01)

(56) References Cited

U.S. PATENT DOCUMENTS

| | | | |
|---|---|---|---|
| 2017/0018363 A1 | 1/2017 | Tanaka et al. | |
| 2017/0283328 A1 | 10/2017 | Sakurai et al. | |
| 2018/0130601 A1* | 5/2018 | Kim | H01G 4/33 |
| 2019/0304681 A1* | 10/2019 | Iguchi | H01G 4/008 |
| 2019/0304693 A1* | 10/2019 | Iguchi | H01G 4/1227 |
| 2019/0348222 A1 | 11/2019 | Kato | |
| 2019/0371528 A1* | 12/2019 | Takashima | H01G 4/012 |
| 2020/0105470 A1 | 4/2020 | Araki | |
| 2020/0258689 A1 | 8/2020 | Kato | |

| | | | |
|---|---|---|---|
| 2023/0046855 A1* | 2/2023 | Inomata | C04B 35/465 |

FOREIGN PATENT DOCUMENTS

| | | |
|---|---|---|
| JP | 2019197790 A | 11/2019 |
| JP | 2020053573 A | 4/2020 |
| JP | 2020136298 A | 8/2020 |
| JP | 2020141091 A | 9/2020 |
| KR | 20170009754 A | 1/2017 |
| WO | 2007074731 A1 | 7/2007 |

OTHER PUBLICATIONS

Written Opinion in PCT/JP2022/035978, mailed Dec. 20, 2022, 4 pages.

* cited by examiner

100

MULTILAYER CERAMIC CAPACITOR

CROSS REFERENCE TO RELATED APPLICATIONS

This application claims the benefit of priority to Japanese Patent Application No. 2021-161109, filed on Sep. 30, 2021, and is a Continuation Application of PCT Application No. PCT/JP2022/035978, filed on Sep. 27, 2022. The entire contents of each application are hereby incorporated herein by reference.

BACKGROUND OF THE INVENTION

1. Field of the Invention

The present invention relates to multilayer ceramic capacitors.

2. Description of the Related Art

Along with reduction in size of electronic devices such as mobile phones and an increase in speed of CPUs, a demand for multilayer ceramic capacitors (MLCC) has been increasing. A multilayer ceramic capacitor has a structure in which dielectric layers and inner electrode layers are alternately laminated, and has a large electrostatic capacitance despite a small size thereof due to the dielectric layers thinned and having a high permittivity. Among known multilayer ceramic capacitors using various materials, those using a barium titanate (BaTiO$_3$)-based compound for dielectric layers and a non-precious metal such as nickel (Ni) for inner electrode layers are widely used because they are inexpensive and exhibit high characteristics.

For example, Japanese Unexamined Patent Application Publication No. 2017-178686 describes that a dielectric ceramic composition containing a main component of a perovskite compound represented by the formula (Ba1−x−ySrxCay)m(Ti1−zZrz)O$_3$, a first sub-component of oxides of rare earth elements R, a second sub-component of oxides of Mg, a third sub-component of oxides of at least one element M selected from Mn, Cr, Co and Fe, and a fourth sub-component as a sintering aid is applied to a dielectric layer of a multilayer ceramic capacitor, and Ni or Ni alloys are preferred as conductive materials contained in inner electrode layers (Claim 1 and paragraphs [0017] and [0039] of Japanese Unexamined Patent Application Publication No. 2017-178686).

In order to achieve a reduction in size and an increase in capacitance of a multilayer ceramic capacitor, it is important to increase the permittivity of the dielectric layer and to reduce the thickness of the dielectric layer. However, when the permittivity is increased by adjusting the composition of the main component of the dielectric layer, a temperature change tends to increase. When the temperature change of the permittivity is large, capacitance temperature characteristics of the multilayer ceramic capacitor deteriorates. Further, when the dielectric layer is made thinner, the life of insulation resistance between the inner electrode layers is shortened, which leads to a problem of deterioration in reliability. Although the existing techniques have a certain effect, there is a limit in obtaining a multilayer ceramic capacitor having a high permittivity, flat temperature characteristics, and excellent reliability.

SUMMARY OF THE INVENTION

Example embodiments of the present invention provide multilayer ceramic capacitors each with a high permittivity, able to be reduced in size with increased capacitance, and with flat temperature characteristics of permittivity and excellent reliability.

Note that in this specification, the expression "to" includes numerical values at two ends. That is, "X to Y" is synonymous with "equal to or more than X and equal to or less than Y".

According to an example embodiment of the present invention, a multilayer ceramic capacitor includes a multilayer body including a first main surface and a second main surface opposite to each other in a thickness direction, a first side surface and a second side surface opposite to each other in a width direction, and a first end surface and a second end surface opposite to each other in a length direction. The multilayer body includes a plurality of dielectric layers and a plurality of inner electrode layers laminated in the thickness direction, and a pair of outer electrodes on the first end surface and the second end surface and connected to the plurality of inner electrode layers. The dielectric layers include dielectric particles. The multilayer body includes a layered first side portion extending along the first side surface and not including an inner electrode layer, a layered second side portion extending along the second side surface and not including an inner electrode layer, a first outer layer portion sandwiched between the first side portion and the second side portion and sandwiched between the first main surface and an inner electrode layer closest to the first main surface among the plurality of inner electrode layers, a second outer layer portion sandwiched between the first side portion and the second side portion and sandwiched between the second main surface and an inner electrode layer closest to the second main surface among the plurality of inner electrode layers, and an inner layer portion sandwiched between the first side portion and the second side portion and sandwiched between the first outer layer portion and the second outer layer portion. In a cross section crossing a center of the multilayer body in the length direction, a dielectric layer at a center or an approximate center of the inner layer portion in the thickness direction includes particles having voids as the dielectric particles.

According to example embodiments of the present invention, it is possible to provide multilayer ceramic capacitors each with a high permittivity, able to be reduced in size and having increased capacitance, and with flat temperature characteristics of the permittivity and excellent reliability.

The above and other elements, features, steps, characteristics and advantages of the present invention will become more apparent from the following detailed description of the example embodiments with reference to the attached drawings.

DETAILED DESCRIPTION OF EXAMPLE EMBODIMENTS

Example embodiments of the present invention will be described with reference to the drawings. Note that the present invention is not limited to the following example embodiments, and various modifications can be made within a range not changing the gist of the present invention.

(1) Multilayer Ceramic Capacitor

A multilayer ceramic capacitor according to an example embodiment of the present invention includes a first main surface and a second main surface opposite to each other in a thickness direction, a first side surface and a second side surface opposite to each other in a width direction, and a first end surface and a second end surface opposite to each other in a length direction. The multilayer ceramic capacitor includes a multilayer body including a plurality of dielectric layers and a plurality of inner electrode layers laminated in the thickness direction, and a pair of outer electrodes provided on the first end surface and the second end surface and connected to the plurality of inner electrode layers. The dielectric layers include dielectric particles. In addition, the multilayer body includes a layered first side portion extending along the first side surface and not including an inner electrode layer, a layered second side portion extending along the second side surface and not including an inner electrode layer, a first outer layer portion sandwiched between the first and second side portions and sandwiched between the first main surface and an inner electrode layer closest to the first main surface among the plurality of inner electrode layers, a second outer layer portion sandwiched between the first and second side portions and sandwiched between the second main surface and an inner electrode layer closest to the second main surface among the plurality of inner electrode layers, and an inner layer portion sandwiched between the first and second side portions and sandwiched between the first and second outer layer portions. Further, in a cross section crossing a center of the multilayer body in the length direction, the dielectric layer at a center of the inner layer portion in the thickness direction includes particles having voids as the dielectric particles.

Figure 1:
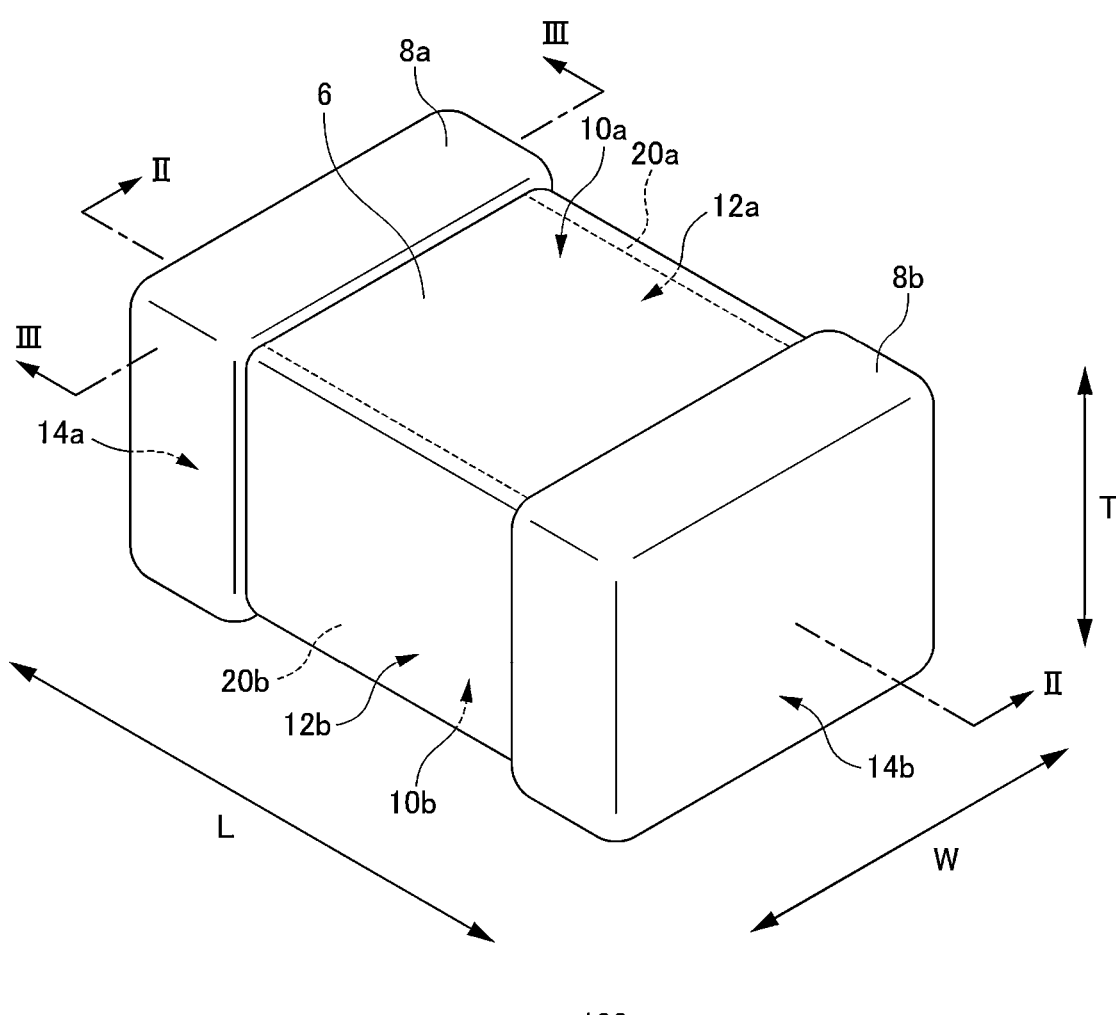
FIG. 1 is a perspective view illustrating an outer shape of a multilayer ceramic capacitor according to an example embodiment of the present invention.
Figure 2:
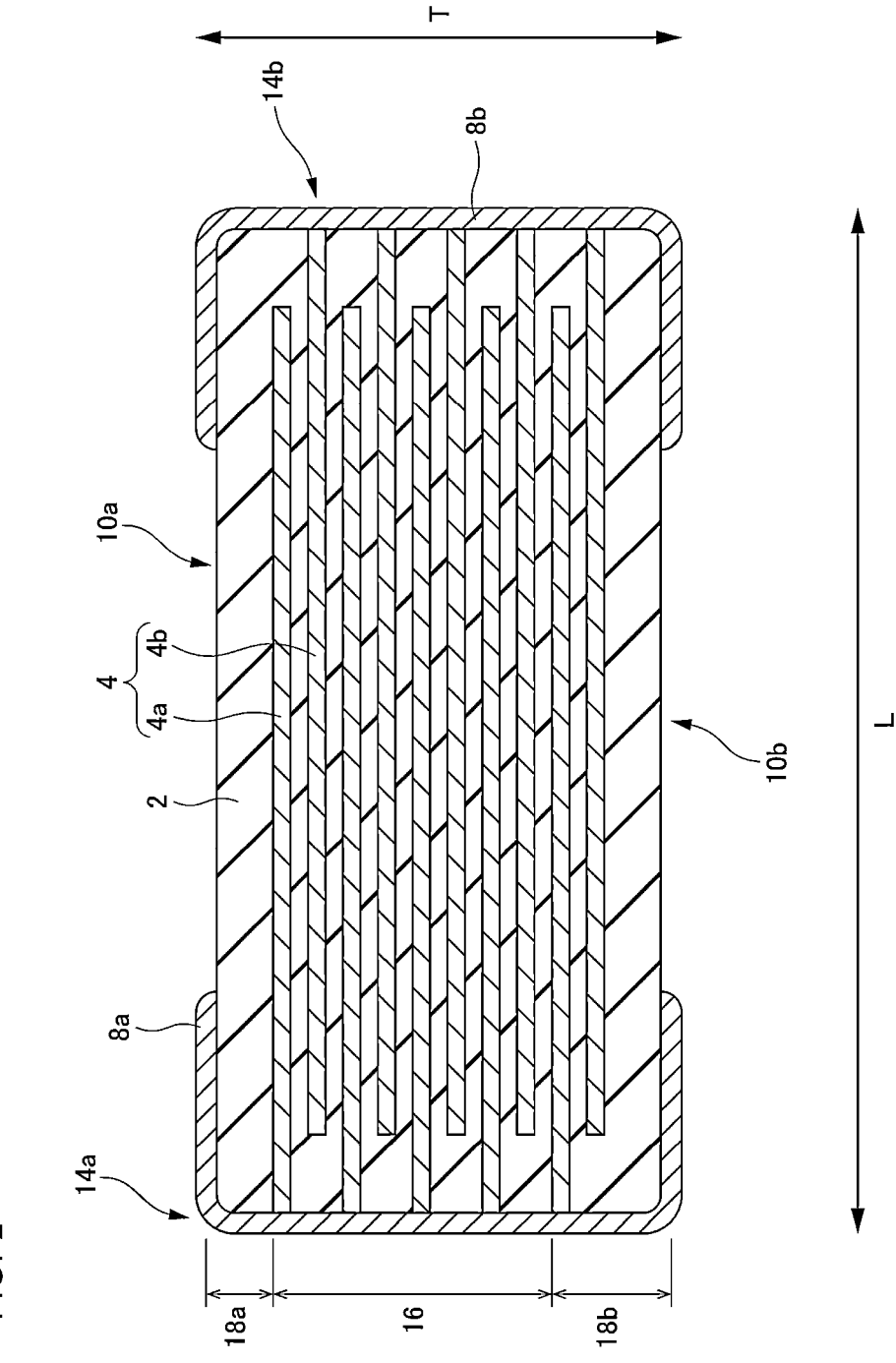
FIG. 2 is a sectional view schematically illustrating an internal structure of the multilayer ceramic capacitor in FIG. 1.
Figure 3:
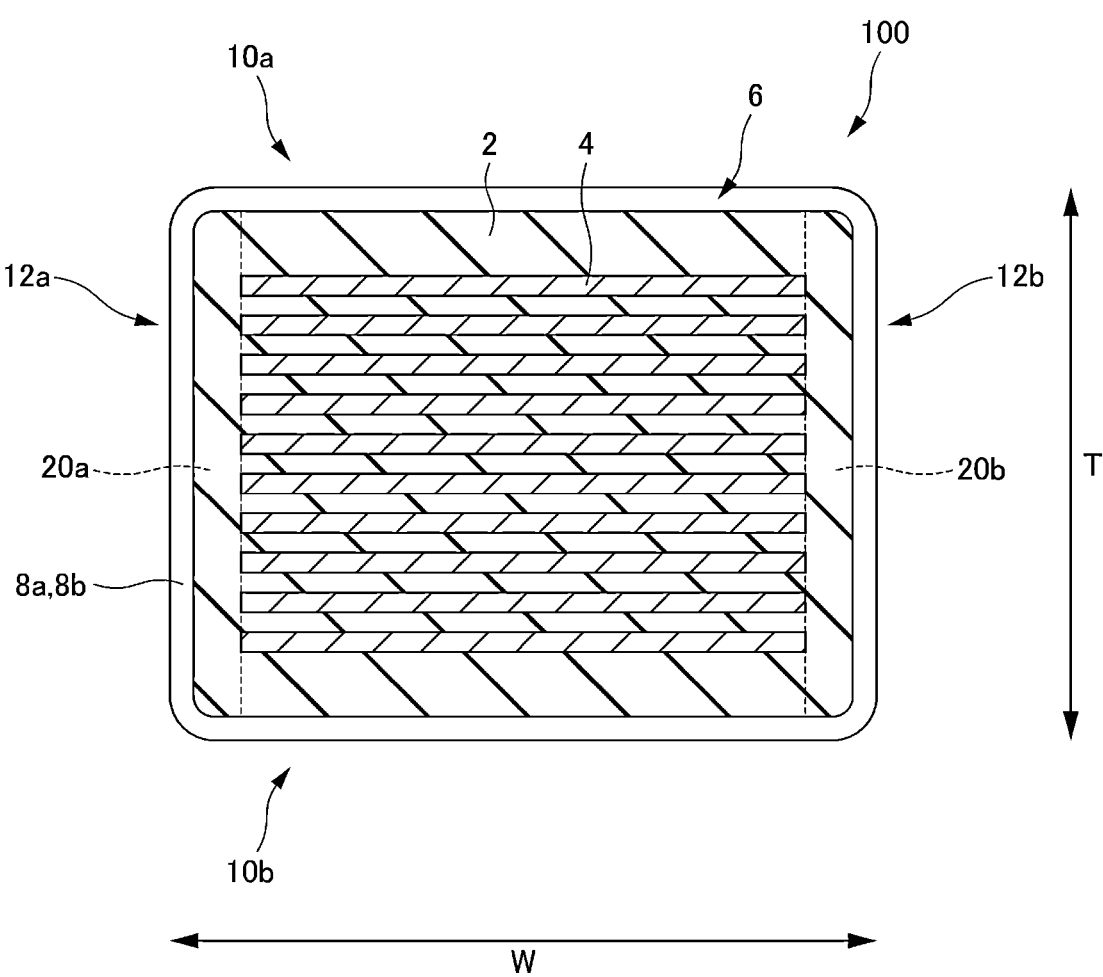
FIG. 3 is a sectional view schematically illustrating an internal structure of the multilayer ceramic capacitor in FIG. 1.

A multilayer ceramic capacitor according to an example embodiment of the present invention will be described with reference to FIG. 1 to FIG. 3. FIG. 1 is a perspective view illustrating an outer shape of a multilayer ceramic capacitor. FIG. 2 illustrates a cross section of the multilayer ceramic capacitor taken along line II-II of FIG. 1, and FIG. 3 is a sectional view of the multilayer ceramic capacitor taken along line III-III of FIG. 1.

A multilayer ceramic capacitor (100) includes a multilayer body (6) including a plurality of laminated dielectric layers (2) and a plurality of laminated inner electrode layers (4), and a pair of outer electrodes (8a, 8b) provided on two end surfaces (14a, 14b) of the multilayer body (6). The multilayer ceramic capacitor (100) and the multilayer body (6) have a rectangular or substantially rectangular parallelepiped shape. The rectangular or substantially rectangular parallelepiped includes not only a rectangular parallelepiped but also a rectangular parallelepiped having rounded corner portions and/or ridge portions. Here, the corner portion is a portion where three surfaces of the multilayer body (6) intersect, and the ridge portion is a portion where two surfaces of the multilayer body intersect. Preferably, the multilayer ceramic capacitor (100) and the multilayer body (6) have a rectangular or substantially rectangular parallelepiped shape with rounded corner portions and/or ridge portions.

The multilayer ceramic capacitor (100) and the multilayer body (6) include a first main surface (10a) and a second main surface (10b) opposite to each other in a thickness direction T, a first side surface (12a) and a second side surface (12b) opposite to each other in a width direction W, and a first end surface (14a) and a second end surface (14b) opposite to each other in a length direction L. The thickness direction T refers to a direction in which the dielectric layers (2) and the inner electrode layers (4) are laminated. The length direction L is orthogonal or substantially orthogonal to the thickness direction T and indicates a direction in which the end surfaces (14a and 14b) are opposite to each other. The width direction W is a direction orthogonal or substantially orthogonal to the thickness direction T and the length direction L. A plane including the thickness direction T and the width direction W is defined as a WT plane, a plane including the width direction W and the length direction L is defined as an LW plane, and a plane including the length direction L and the thickness direction T is defined as an LT plane.

The outer electrodes (8a, 8b) include a first outer electrode (8a) provided on the first end surface (14a) and a second outer electrode (8b) provided on the second end surface (14b). The first outer electrode (8a) may wrap around not only the first end surface (14a) but also a portion of the first main surface (10a), the second main surface (10b), the first side surface (12a), and the second side surface (12b). In addition, the second outer electrode (8b) may wrap around not only the second end surface (14b) but also a portion of the first main surface (10a), the second main surface (10b), the first side surface (12a), and the second side surface (12b). However, the first outer electrode (8a) and the second outer electrode (8b) are not in contact with each other and are electrically separated from each other.

The inner electrode layers (4) include a plurality of first inner electrode layers (4a) and a plurality of second inner electrode layers (4b). Each of the first inner electrode layer (4a) and the second inner electrode layer (4b) includes rectangular or substantially rectangular opposing electrode portions opposite to each other and extended electrode portions extending to the end surfaces (14a, 14b) and connected to the outer electrodes (8a, 8b). That is, the plurality of first inner electrode layers (4a) extend to the first end surface (14a) via the extended electrode portion and is electrically connected to the first outer electrode (8a) at the first end surface (14a). In addition, the plurality of second inner electrode layers (4b) extend to the second end surface (14b) via the extended electrode portion and is electrically connected to the second outer electrode (8b) at the second end surface (14b). The first inner electrode layer (4a) and the second inner electrode layer (4b) are alternately laminated so as to be opposite to each other with the dielectric layer (2) interposed therebetween in the thickness direction T. The first inner electrode layer (4a) and the second inner electrode layer (4b) opposite to each other with the dielectric layer (2) interposed therebetween are not electrically connected to each other. Therefore, when a voltage is applied via the outer electrodes (8a, 8b) and the extended electrode portions, charges are accumulated between the opposing electrode portion of the first inner electrode layer (4a) and the opposing electrode portion of the second inner electrode layer (4b). The accumulated charges generate electrostatic capacitance, and thus define and function as a capacitive element (capacitor).

The multilayer body (6) includes an inner layer portion (16), a first outer layer portion (18a), a second outer layer portion (18b), a first side portion (20a), and a second side portion (20b). The first side portion (20a) is a layered region, which extends along the first side surface (12a) and does not include the inner electrode layers (4a, 4b). In addition, the second side portion (20*b*) is a layered region, which extends along the second side surface (12*b*) and does not include the inner electrode layers (4*a*, 4*b*). That is, the first side portion (20*a*) is a region sandwiched between the first side surface (12*a*) and end portions of the inner electrode layers (4*a*, 4*b*) on the first side surface (12*a*) side, and the second side portion is a region sandwiched between the second side surface (12*b*) and end portions of the inner electrode layers (4*a*, 4*b*) on the second side surface (12*b*) side.

The first outer layer portion (18*a*) is a region sandwiched between the first side portion (20*a*) and the second side portion (20*b*), and sandwiched between the first main surface (10*a*) and one of the plurality of inner electrode layers (4*a*, 4*b*), which is closest to the first main surface (10*a*). The second outer layer portion (18*b*) is a region sandwiched between the first side portion (20*a*) and the second side portion (20*b*), and sandwiched between the second main surface (10*b*) and one of the plurality of inner electrode layers (4*a*, 4*b*), which is closest to the second main surface (10*b*). The inner layer portion (16) is a region sandwiched between the first outer layer portion (18*a*) and the second outer layer portion (18*b*), that is, a region arranged between the inner electrode layer closest to the first main surface (10*a*) and the inner electrode layer closest to the second main surface (10*b*). The inner layer portion functions as a capacitive element. In short, the inner layer portion (16) having the function of the capacitive element is sandwiched between the first outer layer portion (18*a*) and the second outer layer portion (18*b*) in the laminating (thickness) direction, and the whole of them is sandwiched between the first side portion (20*a*) and the second side portion (20*b*) in the width direction.

The size of the multilayer ceramic capacitor (100) and the size of the multilayer body (6) are not particularly limited. For example, the dimension in the length direction L is preferably equal to or more than about 0.2 mm and equal to or less than about 3.2 mm, the dimension in the width direction W is equal to or more than about 0.1 mm and equal to or less than about 2.5 mm, and the dimension in the laminating direction T is equal to or more than about 0.1 mm and equal to or less than about 2.5 mm. Although FIGS. 1 to 3 show that the dimension in the length direction L is larger than the dimension in the width direction W, the multilayer ceramic capacitor of the present example embodiment is not limited to one having such dimensions. The dimension in the length direction L may be smaller than the dimension in the width direction W.

Inner Layer Portion-Dielectric Layer

The dielectric layer defines the inner layer portion of the multilayer ceramic capacitor together with the inner electrode layer. The dielectric layer includes dielectric particles (dielectric grains). The dielectric particles are preferably made of a perovskite oxide, for example, and are a main component of the dielectric layer. The dielectric layer is made of, for example, a sintered polycrystalline body (ceramic) in which a large number of dielectric particles are bonded to each other via grain boundaries and triple points. The dielectric layer can be referred to as a dielectric ceramic including a perovskite oxide as a main component. The main component is a component having the highest content in the dielectric layer. The content of the dielectric particles (perovskite oxide) as the main component in the dielectric layer may be, for example, equal to or more than about 50 mass %, equal to or more than about 60 mass %, equal to or more than about 70 mass %, equal to or more than about 80 mass %, or equal to or more than about 90 mass %.

The perovskite oxide has a composition represented by the general formula: $ABO_3$, and has a cubic crystal-like crystal structure such as cubic, tetragonal, orthorhombic, or rhombohedral at room temperature. In addition, atoms of an A-site element (hereinafter, referred to as "A-site atoms") and atoms of a B-site element (hereinafter, referred to as "B-site atoms") are ionized and occupy the A-site and the B-site of the perovskite structure, respectively. Examples of the A-site element include elements having a relatively large ion size such as barium (Ba), calcium (Ca), and strontium (Sr), and examples of the B-site element include elements having a relatively small ion size such as titanium (Ti), zirconium (Zr), and hafnium (Hf). The combination of the A-site element and the B-site element is not particularly limited as long as the perovskite structure is maintained. Each of the A-site element and the B-site element may include only one kind of element, or may include a plurality of elements in combination. Further, a molar ratio of A-site elements to B-site elements may deviate from 1:1 as long as the perovskite structure is maintained.

Specific examples of the perovskite oxides include barium titanate ($BaTiO_3$)-based compounds, calcium titanate ($CaTiO_3$)-based compounds, strontium titanate ($SrTiO_3$)-based compounds, and mixed crystals and solid solutions thereof. Preferably, for example, the A-site element includes barium (Ba) and the B-site element contains titanium (Ti). That is, the perovskite oxides are preferably, for example, barium titanate ($BaTiO_3$)-based compounds. $BaTiO_3$ has a large spontaneous polarization at room temperature. Therefore, $BaTiO_3$ is the ferroelectric substance having a high permittivity. By using the $BaTiO_3$-based compounds as a main component, the capacitance of the capacitor can be further increased. The $BaTiO_3$-based compounds include not only $BaTiO_3$ but also a component in which a portion of Ba in $BaTiO_3$ is replaced with other A-site elements such as Sr and/or Ca, or component in which a part of Ti is replaced with other B-site elements such as Zr and/or Hf. However, the ratio of Ba in the A-site element is, for example, preferably equal to or more than about 70%, more preferably equal to or more than about 80%, and still more preferably equal to or more than about 90% in terms of molar ratio. In addition, the ratio of Ti in the B-site element is, for example, preferably equal to or more than about 70%, more preferably equal to or more than about 80%, and still more preferably equal to or more than about 90% in terms of molar ratio. The A-site element may contain no component other than Ba and an incidental impurity element, and the B-site element may contain no component other than Ti and the incidental impurity element. Here, the incidental impurities are components that are inevitably mixed in during the manufacturing process.

The dielectric layer may include a sub-component. Examples of the sub-components include, but are not limited to, rare earth elements (RE), magnesium (Mg), manganese (Mn), iron (Fe), chromium (Cr), cobalt (Co), nickel (Ni), silicon (Si), aluminum (Al), vanadium (V), and compounds thereof. The rare earth element (RE) is a generic term for elements defining a group including of scandium (Sc) having an atomic number of 21, yttrium (Y) having an atomic number of 39, and lanthanum (La) having an atomic number of 57 to lutetium (Lu) having an atomic number of 71 in the periodic table. The rare earth element (RE) is preferably, for example, one or more elements selected from the group consisting of lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), and yttrium (Y). As the sub-component, the above-described component may be included alone, or a plurality of components may be included in combination.

When the dielectric layer includes the sub-component, the existence form of the sub-component is not limited. The sub-component may be included in any of the dielectric particles, the grain boundaries, and the triple points. When the sub-component is included in the dielectric particles, it may be included in a solid solution state. In this case, the A-site or the B-site of the perovskite oxides ($ABO_3$) may be occupied, or both sites may be occupied at the same time. In addition, the distribution of the sub-component in the dielectric particles may be uniform or non-uniform.

The dielectric particles may include core-shell particles. The core-shell particles are particles having a structure (core-shell structure) in which at least a portion of the sub-component is dissolved in a surface layer (shell portion) of the particles at a high concentration, and the sub-component is dissolved at a low concentration or is not dissolved in the central portion (core portion) of the particles. By providing the dielectric particles with the core-shell structure, the temperature characteristics of the permittivity can be flattened and the reliability can be improved. That is, in the core-shell particle, the core portion and the shell portion have different permittivity temperature characteristics because of different sub-component concentrations. Therefore, the temperature characteristics of permittivity of the entire particle can be flattened. In addition, by forming a solid solution of the sub-component such as a rare earth element that functions as a donor or an acceptor in the shell portion, it is possible to reduce or prevent the movement of oxygen vacancies that causes insulation deterioration and to significantly increase the reliability of the multilayer ceramic capacitor.

Whether or not the particles have a core-shell structure can be determined by comparing the concentration of each sub-component in the center portion of the particles (core portion) with the concentration of each sub-component in a portion inside the particles (shell portion) at a depth of about 10 nm from an interface between the particles and the grain boundary phase. When the concentration of the sub-component in the shell portion is equal to or more than about 150% of the concentration of the sub-component in the core portion, the particle can be determined as a core-shell particle.

The dielectric particles may include uniform solid solution particles. The uniform solid solution particle is a particle in which the sub-component is uniformly dissolved in the particle or a particle in which the sub-component is not dissolved. The uniform solid solution particle is also called a non-core-shell particle. In order to achieve uniform solid solution, it is preferable to incorporate the sub-component into the particles along with grain growth and to form a solid solution, and for this purpose, it is preferable to grow the particles to a certain size. By using the particles in which the sub-component is uniformly dissolved, the permittivity can be further increased. The core-shell particles have an advantage that the temperature characteristics of the permittivity can be flattened and the reliability can be improved, but there is a limit in increasing the permittivity itself. In contrast, the permittivity can be markedly increased by using the uniform solid solution particles.

In the multilayer ceramic capacitor of the present example embodiment, in the cross section crossing the central portion of the multilayer body in the length direction, the dielectric layer at the center in the thickness direction of the inner layer portion preferably includes particles having voids (particles with voids) as dielectric particles (dielectric grains). That is, when the multilayer ceramic capacitor is processed to expose a surface (WT plane) that crosses the center or approximate center of the multilayer body in the length direction and includes the width direction and the thickness direction, the dielectric particles in the dielectric layer at a predetermined position on the WT plane are partially or entirely the particles with voids. In the particles with voids, the voids are present inside the particle.

By providing the particles with voids, it is possible to improve various characteristics of the dielectric layer, for example, the permittivity, the temperature characteristics of the permittivity, and the reliability. That is, the dielectric particles having no void may have low crystallinity. When the crystallinity of the particles is low, the sub-component elements may excessively diffuse into the particles in the firing process during the manufacturing of the multilayer ceramic capacitor, and various characteristics may deteriorate. For example, when the formation of core-shell particles is intended, the sub-component element diffuses into the core portion through the shell portion, and the core-shell structure may be destroyed. Further, when the formation of uniform solid solution particles is intended, the sub-component elements are excessively dissolved in the particles, and it may be difficult to obtain desired characteristics. In contrast, the portion around the void of the particles with voids has high crystallinity, and thus excessive diffusion of the sub-component element is reduced or prevented. For example, when the dielectric particles are core-shell particles, even though the grain growth is performed in the firing process, diffusion and solid solution of the sub-component do not proceed more than necessary. Since the grain growth can be performed without destroying the core-shell structure, a high permittivity, flat temperature characteristics, and excellent reliability can be achieved.

The number of voids in the particles with voids is not particularly limited. The particle may include a single void therein, or may include a plurality of voids. In addition, the distribution of the voids in the particles is not particularly limited. Typically, a void is present near the center of the particle.

The presence of the particles with voids and the ratio thereof can be examined as follows. First, the multilayer ceramic capacitor is processed by a method such as, for example, polishing, grinding, and/or cutting to expose a cross section thereof. This cross section is a plane that crosses the central portion of the multilayer ceramic capacitor in the length (L) direction and includes the width (W) direction and the thickness (T) direction, that is, the WT plane. Next, the obtained cross section is observed with a transmission electron microscope (TEM) to obtain a high-angle annular dark field (HAADF) image, and the presence of the particles with voids and the ratio thereof are examined based on the image. The voids can be easily found because they appear as black spots in the particles. The observation is performed on a substantially central portion in the thickness (T) direction of the WT plane. When a dielectric layer is present in the central portion in the thickness direction, the dielectric layer may be observed. On the other hand, when the inner electrode layer is present in the central portion in the thickness direction, the dielectric layer adjacent to the inner electrode layer may be observed. The observation is performed on 100 or more dielectric particles. For example, the observation is performed in a visual field of about 1000 nm×about 1000 nm, and the number of particles with voids is counted for the dielectric particles present in this visual field. When 100 or more dielectric particles are not present in this visual field, a plurality of adjacent visual fields may be included in the examination. For example, a plurality of visual fields may be connected to each other, and observation may be performed in a visual field region of about 3 μm×about 3 μm in total. Then, the number (N) of dielectric particles and the number (n) of particles with voids are counted, and a ratio (n/N) of number of the particles with voids is obtained from the counted numbers.

Preferably, the particles with voids are present in the vicinity of the center in the width direction of the inner layer portion. That is, in a cross section crossing the central portion of the multilayer body in the length direction, the dielectric layer at the center or approximate center of an inner layer intermediate region in the thickness direction preferably includes the particles with voids as the above dielectric particles. The inner layer intermediate region is a region located in the middle of the inner layer portion in the width direction. Specifically, when the multilayer body is divided into a first inner layer side region, a second inner layer side region, and an inner layer intermediate region, a region sandwiched between the first inner layer side region and the second inner layer side region is the inner layer intermediate region. In addition, the first inner layer side region is a region in the inner layer portion that occupies a portion at a distance equal to or less than an end portion distance from an interface between the inner layer portion and the first side portion. Here, the end portion distance is, for example, the smaller of about W/10 and about 40 μm, where W is the width of the multilayer body. The first inner layer side region can also be referred to as a region in the inner layer portion, which is sandwiched between the interface between the inner layer portion and the first side portion and a surface spaced away from the interface by the end portion distance. In addition, the second inner layer side region is a region in the inner layer portion that occupies a portion at a distance equal to or less than the end portion distance from an interface between the inner layer portion and the second side portion. The second inner layer portion side region can also be referred to as a region in the inner layer portion, which is sandwiched between the interface between the inner layer portion and the second side portion and a surface spaced away from the interface by the end portion distance.

Preferably, the number of particles with voids is large in the vicinity of the center in the width direction of the inner layer portion. Specifically, in a cross section crossing the central portion of the multilayer body in the length direction, a ratio (Cn/CN) of number of the particles with voids in the dielectric particles at the center or approximate center in the thickness direction of the inner layer intermediate region is preferably, for example, equal to or more than about 15%. By increasing the ratio of the particles with voids in the inner layer intermediate region, the permittivity of the dielectric layer, the temperature characteristics of the permittivity, and the reliability can be further improved. The ratio (Cn/CN) of number may be, for example, equal to or more than about 20%, equal to or more than about 25%, equal to or more than about 30%, equal to or more than about 35%, or equal to or more than about 40%. An upper limit of the ratio (Cn/CN) of number is not particularly limited. It may be equal to or less than 100%, equal to or less than about 80%, or equal to or less than about 60%.

Preferably, the particles with voids are present in the vicinity of the end portion in the width direction of the inner layer portion. That is, in a cross section crossing the central portion of the multilayer body in the length direction, the dielectric layer at the center or approximate center in the thickness direction of at least one of the first inner layer side region and the second inner layer side region preferably includes the particles with voids as the dielectric particles. This makes it possible to further improve the reliability. When the multilayer ceramic capacitor is operated, an electric field is concentrated in the vicinity of the end portion of the inner electrode layer, and thus electrical breakdown is likely to occur in the vicinity of the end portion. By providing the particles with voids, having high crystallinity, in the dielectric layer in the vicinity of the end portion, the progress of electrical breakdown can be reduced or prevented, and as a result, the reliability can be markedly improved.

Preferably, the number of particles with voids is large in the vicinity of the end portion in the width direction of the inner layer portion. That is, in a cross section crossing the central portion of the multilayer body in the length direction, a ratio (Wn/WN) of number of the particles with voids in the dielectric particles at the center or approximate center in the thickness direction of at least one of the first inner layer side region and the second inner layer side region is preferably larger than the ratio (Cn/CN) of number of the particles with voids in the dielectric particles at the center or approximate center in the thickness direction of the inner layer intermediate region. Further, in a cross section crossing the central portion of the multilayer body in the length direction, the ratio (Wn/WN) of number of the particles with voids in the dielectric particles at the center or approximate center in the thickness direction of at least one of the first inner layer side region and the second inner layer side region is preferably, for example, equal to or more than about 25%. By increasing the ratio of the particles with voids in the dielectric layer in the vicinity of the end portion in this manner, the reliability can be further markedly improved. The ratio (Wn/WN) of number may be, for example, equal to or more than about 30%, equal to or more than about 35%, or equal to or more than about 40%. An upper limit of the ratio (Wn/WN) of number is not particularly limited. It may be, for example, equal to or less than about 100%, equal to or less than about 80%, or equal to or less than about 60%.

The average pore size of the voids is, for example, preferably equal to or more than about 1 nm and equal to or less than about 50 nm, particularly preferably equal to or more than about 10 nm and equal to or less than about 30 nm. By limiting the pore size to a predetermined value or more, an effect of improving the crystallinity of the particles can be sufficiently provided, and capacitance temperature characteristics can be markedly reduced or prevented. Further, by limiting the pore size to a predetermined value or less, deterioration of dielectric characteristics due to voids can be reduced or prevented, and the permittivity can be markedly increased.

The average particle size of the dielectric particles is, for example, preferably equal to or more than about 100 nm and equal to or less than about 500 nm, particularly preferably equal to or more than about 130 nm and equal to or less than about 300 nm. By limiting the average particle size to a predetermined value or more, the effect of improving the crystallinity of the particles can be sufficiently provided, and the capacitance temperature characteristics can be markedly reduced or prevented. Further, by limiting the average particle size to a predetermined value or less, the dielectric layer can be made thinner, which contributes to an increase in the capacitance of the multilayer ceramic capacitor and has an advantageous effect of improving the reliability. The average particle size described above is an average particle size of the entire dielectric particles including not only the particles with voids but also particles without voids.

The thickness of the dielectric layer is, for example, preferably equal to or more than about 0.30 μm and equal to or less than about 1.00 μm, more preferably equal to or more than about 0.40 μm and equal to or less than about 0.50 μm, and still more preferably equal to or more than about 0.40 μm and equal to or less than about 0.45 μm. By setting the thickness of the dielectric layer to a predetermined value or more, it is possible to reduce or prevent the occurrence of electrical breakdown and the deterioration of the length of life when the multilayer ceramic capacitor is used. Further, by setting the thickness of the dielectric layer to a predetermined value or less, the dielectric layer is made thinner, and the capacitance of the multilayer ceramic capacitor can be further increased. The number of layers of the dielectric layers is not particularly limited. The number of layers of the dielectric layers defining the outer layer portion and the inner layer portion is, for example, preferably about 100 or more and about 2000 or less.

The composition of the dielectric layer occupying the inner layer portion is not particularly limited. However, for example, a preferred composition includes barium titanate ($BaTiO_3$) as a main component, and further includes, as sub-components, about 0.6 to about 2.0 mol part of dysprosium (Dy), about 0.08 to about 0.4 mol part of manganese (Mn), about 0.01 to about 0.2 mol part of magnesium (Mg), about 0.6 to about 2.0 mol part of silicone (Si), about 0.2 to about 5.0 mol part of nickel (Ni), about 0.04 to about 0.3 mol part of aluminum (Al), and about 0.04 to about 0.2 mol part of vanadium (V), with respect to about 100 mol part of titanium (Ti).

Inner Layer Portion-Inner Electrode Layer

The inner electrode layers (first inner electrode layer, second inner electrode layer) define the inner layer portion together with the dielectric layer. In addition, the inner electrode layer is defined by the opposing electrode portions and the extended electrode portion, and the opposing electrode portion sandwiches the dielectric layer to define and function as a capacitive element. The extended electrode portion electrically connects the opposing electrode portion and the outer electrode. The inner electrode layer includes a conductive metal. As the conductive metal, an electrode material such as, for example, nickel (Ni), copper (Cu), silver (Ag), palladium (Pd), a silver (Ag)-palladium (Pd) alloy, and/or gold (Au) may preferably be used. However, from the viewpoint of cost reduction, for example, Ni and Cu, which are non-precious metals, are more preferable, and Ni is particularly preferable.

The inner electrode layer may include another component other than the conductive metal. As the other component, for example, a ceramic component, which functions as a co-material, can be mentioned. By adding the co-material, shrinkage behavior of the inner electrode layer can be matched with that of the dielectric layer in the firing process in the manufacturing of the multilayer ceramic capacitor. Therefore, it is possible to reduce or prevent the occurrence of defects such as peeling of the inner electrode layer due to the difference in shrinkage behavior. As the ceramic components, dielectric particles such as $BaTiO_3$-based compounds included in the dielectric layers are suitable. In addition, the thickness of the inner electrode layer is, for example, preferably equal to or more than about 0.30 μm and equal to or less than about 0.40 μm, and more preferably equal to or more than about 0.30 μm and equal to or less than about 0.35 μm. By setting the thickness of the inner electrode to a predetermined value or more, it is possible to prevent the occurrence of problems such as electrode disconnection. Further, by setting the thickness to a predetermined value or less, the proportion of the dielectric layer in the capacitor can be prevented from decreasing, which contributes to an increase in capacitance. Further, the number of layers of the inner electrode layers is, for example, preferably about 10 or more and about 1000 or less.

For example, tin (Sn) may be present at an interface between the dielectric layer and the inner electrode layer. When Sn is present, Sn may be present in the form of a layer parallel or substantially parallel to the inner electrode layer, or may be scattered. In addition, Sn may be dissolved in the inner electrode layer or in the dielectric particles defining the dielectric layer.

Outer Layer Portion

The outer layer portions (first outer layer portion and second outer layer portion) are provided above and below the inner layer portion. The outer layer portion is made of a dielectric ceramic and does not include the inner electrode layer therein. The composition of the outer layer portion may be the same as or different from that of the dielectric layer included in the inner layer portion. When the composition of the outer layer portion is the same as that of the inner layer portion, the dielectric green sheet used for forming the inner layer portion may also be used for forming the outer layer portion in the manufacturing of the multilayer ceramic capacitor.

Side Portion

The side portions (first side portion and second side portion) are provided along the side surfaces of the multilayer ceramic capacitor so as to sandwich the inner layer portion and the outer layer portion. The inner layer portion side portion is also called a side gap. The side portion (side gap portion) is made of a dielectric ceramic and is a region not including the inner electrode layer therein. By providing the side portion, it is possible to prevent moisture from entering the inner layer portion from the side surface.

The side portion may be integrally formed with the inner layer portion and the outer layer portion when the multilayer ceramic capacitor is manufactured. In this case, the dielectric layer defining the side portion is continuous with the dielectric layer defining the inner layer portion and/or the outer layer portion in terms of composition and microstructure. On the other hand, the side portion may be formed separately from the inner layer portion and the outer layer portion. Specifically, the multilayer ceramic capacitor may be manufactured by attaching a side portion green body to the side surfaces of the multilayer chip to be the inner layer portion and the outer layer portion to produce a green element body portion, and firing the green element body portion. In this case, the dielectric layer defining the side portion is not continuous with the dielectric layer defining the inner layer portion and/or the outer layer portion in terms of composition and/or microstructure. Therefore, physical and chemical boundaries exist between the side portion and the inner layer portion and/or the outer layer portion.

Preferably, for example, the first side portion and the second side portion contain dielectric particles including barium (Ba) and titanium (Ti), and further include at least one of magnesium (Mg) of equal to or more than about 1.00 mol part and equal to or less than about 3.00 mol part and manganese (Mn) of equal to or more than about 0.50 mol part and equal to or less than about 2.00 mol part with respect to titanium (Ti) of about 100 mol part, the total content of magnesium (Mg) and manganese (Mn) being equal to or less than about 5.00 mol part. By setting the amount of Mg to equal to or more than about 1.00 mol part or the amount of Mn to equal to or more than about 0.50 mol part, moisture resistance load characteristics can be further improved. Further, by setting the amount of Mg to equal to or less than about 3.00 mol part and the amount of Mn to equal to or less than about 2.00 mol part, it is possible to reduce or prevent the capacitance reduction.

Outer Electrode

The outer electrodes (first outer electrode and second outer electrode) define and function as input and output terminals of the multilayer ceramic capacitor. The outer electrodes preferably include a base electrode layer and a plating layer arranged on the base electrode layer may be provided. The base electrode layer includes at least one selected from a baked layer, a resin layer, and a thin film layer. The baked layer is formed by applying a conductive paste containing glass and metal to the multilayer body and then baking the conductive paste. The baking may be performed simultaneously with the firing of the multilayer body, or may be performed after the firing of the multilayer body. The baked layer may be a single layer or may be composed of a plurality of layers. The metal included in the baked layer is preferably copper (Cu), nickel (Ni), silver (Ag), palladium (Pd), a silver (Ag)-palladium (Pd) alloy, and/or gold (Au), for example. The resin layer includes conductive particles and a thermosetting resin. The resin layer may be a single layer or include a plurality of layers. The thin film layer is formed by a thin film forming method such as, for example, a sputtering method or a vapor deposition method, and is a layer having a thickness of, for example, equal to or less than about 1 μm in which metal particles are deposited. The plating layer includes a metal such as, for example, copper (Cu), nickel (Ni), tin (Sn), silver (Ag), palladium (Pd), silver (Ag)-palladium (Pd), and/or gold (Au). The plating layer may be a single layer or include a plurality of layers. A preferable plating layer has, for example, a two-layer structure of Ni plating and Sn plating. The Ni plating layer can prevent erosion of the base layer by solder when the multilayer ceramic capacitor is mounted. In addition, the Sn plating layer has an effect of facilitating mounting of the multilayer ceramic capacitor because the Sn plating layer improves wettability of solder.

The outer electrode layer may include a plating layer without providing the base electrode layer. In this case, the plating layer is directly provided on the multilayer body and is directly connected to the extended electrode portion of the inner electrode layer. However, as a pretreatment, a catalyst may be provided on the multilayer body. Preferably, the plating layer includes a first plating layer and a second plating layer provided on the first plating layer. Alternatively, another plating layer may be provided on the second plating layer. The first plating layer and the second plating layer preferably include, for example, one metal selected from the group consisting of copper (Cu), nickel (Ni), tin (Sn), lead (Pd), gold (Au), silver (Ag), palladium (Pd), bismuth (Bi), and zinc (Zn), or an alloy including the metal. When the inner electrode layer includes Ni, the first plating layer preferably includes Cu having good bonding property with Ni. In addition, the first plating layer preferably includes Ni having good solder barrier performance. The second plating layer preferably includes Sn or Au having good solder wettability.

However, the plating layer is not limited to the one including the first plating layer and the second plating layer. The plating layer may include only the first plating layer without providing the second plating layer. Another plating layer may be provided on the second plating layer. In any case, the plating layer preferably does not include glass. In addition, the metal ratio of the plating layer is preferably equal to or more than about 99% by volume, for example. The plating layer has grain growth along the thickness direction and has a columnar shape.

Method for Manufacturing Multilayer Ceramic Capacitor

An example of a method for manufacturing the multilayer ceramic capacitor of the present example embodiment is not limited as long as the above-described requirements are satisfied. However, it is preferably produced by the following method. The method preferably includes the following processes of: synthesizing a main component raw material for the dielectric layer (synthesis process); mixing the main component raw material with a sub-component raw material to prepare a dielectric raw material (mixing process); adding and mixing a binder and a solvent with the dielectric raw material to form a slurry, and molding a dielectric green sheet from the obtained slurry (molding process); applying a patterned conductive paste layer on a surface of the dielectric green sheet using a conductive paste for an inner electrode (printing process); laminating and pressure-bonding a plurality of dielectric green sheets to produce a multilayer block (laminating process); cutting the obtained multilayer block into multilayer chips (cutting process); attaching a side portion green body to a side surface of the obtained multilayer chip to form a green element body portion (side portion forming process); performing a debinding treatment and a firing treatment on the obtained green element body portion to form an element body portion (firing process); and forming an outer electrode on the obtained element body portion to form a multilayer ceramic capacitor (outer electrode forming process). The details of each process will be described below.

Synthesis Process

In the synthesis process, a main component raw material used for forming the dielectric layer is synthesized. As the main component raw material, a powder of oxides having a perovskite structure such as $BaTiO_3$-based compounds is used. Preferably, the main component raw material is synthesized by a liquid phase method such as, for example, a sol-gel method, an alkoxide method, a solvothermal method, or a hydrothermal synthesis method. In the sol-gel method, a sol or gel of an inorganic salt or organic salt of Ba and Ti is used as raw materials, and these materials are mixed and fired to produce an oxide powder. In the alkoxide method, alkoxides of Ba and Ti are used as raw materials, and these materials are mixed and fired to produce an oxide powder. In the solvothermal method, inorganic or organic compounds of Ba and Ti are put in a closed container together with a solvent, and a high temperature and a high pressure are applied to synthesize an oxide powder. The hydrothermal method is a kind of solvothermal method, and water is used as a solvent.

Mixing Process

In the mixing process, a dielectric raw material is prepared by mixing a main component raw material with a sub-component (for example, Ni, Re, Mg, Mn, Si, Al, V, etc.) raw material. As the sub-component raw material, a known ceramic material such as, for example, an oxide, a carbonate, a hydroxide, a nitrate, an organic acid salt, an alkoxide and/or a chelate compound may be used. The mixing method is not particularly limited. For example, a method of mixing and pulverizing the weighed main component raw material and the weighed sub-component raw material in a wet manner using a ball mill together with a pulverization medium and pure water is exemplified. When the mixing is performed in the wet manner, the mixture may be dried.

Molding Process

In the molding process, a binder and a solvent are added to and mixed with the dielectric raw material to form a slurry, and a dielectric green sheet is formed from the obtained slurry. The dielectric green sheet becomes the dielectric layer defining the inner layer and the outer layer of the multilayer ceramic capacitor after firing. As the binder, a known organic binder such as, for example, a polyvinyl butyral-based binder may be used. Further, as the solvent, a known organic solvent such as, for example, toluene or ethanol may be used. As necessary, additives such as, for example, a plasticizer may be added. The molding may be performed by a known method such as, for example, a RIP method. The thickness of the sheet after molding is, for example, equal to or less than about 1 μm.

Printing Process

In the printing process, a patterned conductive paste layer is formed on the surface of the dielectric green sheet using a conductive paste. The conductive paste layer becomes an inner electrode layer after firing. As the conductive metal included in the conductive paste, a conductive material such as, for example, nickel (Ni), copper (Cu), silver (Ag), palladium (Pd), or an alloy including any of these metals may be used. However, nickel (Ni) is preferred. In addition, a ceramic component as a co-material may be added to the conductive paste. As the ceramic component, a main component raw material of the dielectric layer can be used. The method of forming the conductive paste layer is not particularly limited. For example, a method such as screen printing or gravure printing may be used.

Laminating Process

In the laminating process, a plurality of dielectric green sheets is laminated and pressure-bonded to produce a multilayer block. At this time, the plurality of dielectric green sheets on which the conductive paste layers are formed is laminated so as to be sandwiched from above and below by dielectric green sheets on which the conductive paste layers are not formed. The green sheet on which the conductive paste layer is not formed becomes an outer layer of the multilayer ceramic capacitor through a firing process. On the other hand, the green sheet on which the conductive paste layer is formed becomes a dielectric layer defining an inner layer of the multilayer ceramic capacitor. The number of green sheets to be laminated may be adjusted so as to obtain a required capacitance.

Cutting Process

In the cutting process, the obtained multilayer block is cut into multilayer chips. The cutting may be performed so that chips having a predetermined size are obtained and at least a part of the conductive paste layer is exposed to an end surface of the multilayer chip.

Side Portion Forming Process

As necessary, a side portion forming process is performed. In this process, the side portion is formed separately from the inner layer portion and the outer layer portion. In the side portion forming process, a side portion green body is attached to the side surface of the multilayer chip to form a green element body portion. The conductive paste layer exposed on the side surface of the multilayer chip is covered with the side portion green body. In addition, the side portion green body becomes the side portion of the multilayer ceramic capacitor after firing. As the raw material of the side portion green body, the main component raw material and the sub-component raw material used for the dielectric layer production can be used. However, the composition of the side portion need not be the same as the dielectric layer composition, and may be different. For example, only a portion of the sub-component of the dielectric layer may be used, or a sub-component different from that of the dielectric layer may be added. On the other hand, the composition of the side portion may be the same as that of the dielectric layer.

The side portion green body may be produced and attached by a known method. For example, a method of producing a green sheet from side portion raw material powder and bonding the green sheet to the side surface of the multilayer chip is exemplified. In this case, in order to ensure the adhesion of the green sheet, an adhesion auxiliary agent such as, for example, an organic solvent may be applied to the side surface of the multilayer chip in advance. Alternatively, a method is exemplified in which a paste is prepared from the side portion raw material powder, and the paste is applied to the side surface of the multilayer chip and dried. In addition, the side portion green body may be a single layer or a multilayer body may include a plurality of layers. The side portion green body made of a multilayer body can be obtained by a method of laminating a plurality of green sheets on the side surface of the multilayer chip or a method of repeating application and drying of a paste. When the side portion is formed integrally with the inner layer portion and the outer layer portion, a portion of the dielectric green sheets laminated in the laminating process defines and functions as the side portion, and in this case, it is not necessary to separately perform the side portion forming process.

In addition, as necessary, the multilayer chip or the green element body portion is subjected to barrel polishing. This treatment makes it possible to round the corner portions and/or ridge portions of the multilayer chip or the green element body portion.

Firing Process

In the firing process, the multilayer chip or the green element body portion is subjected to a debinding treatment and a firing treatment to obtain an element body portion. The conductive paste layer and the dielectric green sheet are co-sintered by the firing treatment to form the inner electrode layer and the dielectric layer, respectively. The conditions of the debinding treatment may be determined according to the type of the organic binder included in the green sheet and the conductive paste layer. In addition, the firing treatment may be performed at a temperature at which the multilayer chip is sufficiently densified. For example, the treatment may be performed at a temperature of equal to or more than about 1200° C. and equal to or less than about 1300° C. keeping for 0 minutes or more and about 10 minutes or less. In addition, the firing is performed in an atmosphere in which the BaTiO$_3$-based compound as the main component is not reduced and the oxidation of the conductive material is suppressed. For example, the treatment may be performed in a N2-H2-H2O gas stream having an oxygen partial pressure of about $1.8 \times 10^{-9}$ to about $8.7 \times 10^{-10}$ MPa. Further, annealing treatment may be performed after the firing.

Outer Electrode Forming Process

In the outer electrode forming process, outer electrodes are formed on the element body portion to form a multilayer ceramic capacitor. The outer electrodes may be formed by a known method. For example, a conductive paste containing a conductive component such as Cu or Ni as a main component is applied to end surfaces of the element body portion from which the inner electrodes are extended and exposed, and is baked to form the base layer. The base layer may be formed by a method of applying a conductive paste to two end surfaces of the green element body portion before firing and then performing the firing treatment. After the formation of the base layer, a plating film of Ni, Sn, or the like may be formed on a surface of the base layer by electrolytic plating. Thus, a multilayer ceramic capacitor is produced.

EXAMPLE

The present example embodiment will be described more specifically by way of the following examples. However, the present invention is not limited to the following examples. (1) Production of Multilayer Ceramic Capacitor Comparative Examples 1 to 3 and Examples 1 to 20

Multilayer ceramic capacitors were produced by changing the manufacturing conditions and the composition of the dielectric layer for Comparative Examples 1 to 3 and Examples 1 to 20, and the evaluation thereof was performed. Synthesis of Barium Titanate Powder Barium titanate powder was prepared by a hydrothermal synthesis method. First, titanium oxide ($TiO_2$) powder and barium hydroxide ($Ba(OH)_2$) powder were weighed, and pure water was added thereto to prepare a slurry. The prepared slurry was placed in a sealed container, and the temperature of the slurry was increased to about 200° C. to about 250° C. while stirring the slurry. Then, the temperature was maintained at about 200° C. to about 250° C. for about 4 to about 24 hours to proceed the liquid phase reaction. Thereafter, the pressure inside the sealed container was returned to atmospheric pressure, and the heating of the sealed container was stopped to leave the slurry. After cooling, the slurry was removed from the sealed container and placed in a dryer machine to evaporate the water. The barium titanate powder thus obtained was used as a main component raw material.

Separately from the main component raw material, the sub-component (Ni, Re, Mg, Mn, Si, Al, V) raw materials were weighed. As the sub-component raw materials, nickel oxides (NiO), rare earth oxides ($Dy_2O_3$, etc.), magnesium carbonates ($MgCO_3$), manganese carbonates ($MnCO_3$), silicone oxides ($SiO_2$), aluminum oxides ($Al_2O_3$), and vanadium oxides ($V_2O_5$) were used.

Next, the sub-component raw materials were added to the main component raw material, and after wet mixing using a ball mill, drying and heat treatment were performed to obtain a dielectric raw material. A polyvinyl butyral-based binder and ethanol as an organic solvent were added to the obtained dielectric raw material, and the mixture was wet-mixed by a ball mill for a predetermined time to prepare a slurry. The slurry was formed into a sheet to produce a dielectric green sheet.

Next, a conductive paste mainly including Ni was screen-printed on the surface of the obtained dielectric green sheet to form a pattern of a conductive paste layer to be an inner electrode layer. Thereafter, a plurality of green sheets on which the conductive paste layer was formed were laminated, and green sheets on which the conductive paste layer was not formed were arranged on the upper and lower sides of the laminated green sheets, and the whole was pressure-bonded to produce a multilayer block. The obtained multilayer block was cut into multilayer chips with a dicing saw. The lamination was performed so that the end portions from which the conductive paste layers were extended were alternately arranged. In addition, the cutting was performed so that the conductive paste layer was exposed on the side surface.

The green sheets for side portions (side portion green bodies) were bonded to both side surfaces of the cut multilayer chip, from which the conductive paste layers were exposed, to form green element body portions. The green sheets for side portions were produced in the same manner as the dielectric green sheets except that the composition amounts of the main component raw material and the sub-component raw materials were changed.

The obtained green element body portion was heat-treated in a $N_2$ gas stream at a maximum temperature of about 270° C., and further heat-treated in a $N_2$—$H_2O$—$H_2$ gas stream at a maximum temperature of about 800° C. Thereafter, the firing was performed in the $N_2$—$H_2O$—$H_2$ gas stream. In the comparative examples, the firing was performed under the conditions of a maximum temperature of about 1050° C. to about 1090° C., a temperature increase rate of about 50° C./min, a keeping time of about 60 minutes, and an oxygen partial pressure of about $7.8 \times 10^{-11}$ to about $3.3 \times 10^{-9}$ MPa. Further, in the examples, the firing was performed under the conditions of a maximum temperature of about 1230° C. to about 1400° C., a temperature increase rate of about 20/sec to about 60/sec, a shorter keeping time than in the comparative examples, and an oxygen partial pressure of about $5.0 \times 10^{-19}$ to about $1.7 \times 10^{-12}$ MPa. Subsequently, the heat treatment was performed for about 60 minutes in the $N_2$—$H_2O$—$H_2$ gas stream at a maximum temperature of about 1050° C. Thus, a multilayer body of a multilayer ceramic capacitor was obtained.

A conductive paste including copper (Cu) as a main component was applied to end surfaces of the multilayer body obtained by firing, from which the inner electrode layers were extended. Thereafter, the applied conductive paste was baked at about 900° C. to form a base layer of the outer electrode. Further, Ni plating and Sn plating were performed in this order on a surface layer of the base layer by wet plating. In this way, a multilayer ceramic capacitor was produced.

The produced multilayer ceramic capacitor had a length-L dimension of about 1.0 mm, a width-direction W dimension of about 0.5 mm, and a thickness-direction T dimension of about 0.5 mm. In addition, the thickness of the dielectric layer in the inner layer portion was about 0.48 μm, the thickness of the inner electrode layer was about 0.38 μm, and the number of layers of the dielectric layers was 50.
Evaluation The produced multilayer ceramic capacitors were evaluated for various characteristics as follows.
SEM Observation The WT plane of the multilayer ceramic capacitor was observed using a scanning electron microscope (SEM) to examine the thickness of the dielectric layer and the diameter of the dielectric particle. Specifically, the multilayer ceramic capacitor was polished to the center in the length (L) direction to expose the cross section (WT plane). Next, in the exposed cross section, the thickness of the dielectric layer of the inner layer portion located in the vicinity of the center in the thickness direction was measured on a total of five lines, i.e., the center line in the width direction W and two lines drawn at equal intervals on each of the sides from the center line in the width direction W, and the average value was taken as the thickness of the dielectric layer.

Further, an SEM image of the dielectric particles in the dielectric layer in the exposed cross section was taken under the conditions of a magnification of about 5000 times, an acceleration voltage of about 15 kV, and a visual field of about 30 μm×about 30 μm. Then, the edges of all the dielectric particles were recognized using image processing software to calculate the cross-sectional area of the particles, and the circle equivalent diameter was calculated from this area as the diameter of the particles. The diameters of all the dielectric particles included in the imaged range except for the dielectric particles whose image was partially cut were measured, and the average value thereof was obtained.
TEM Observation The WT plane of the multilayer ceramic capacitor was observed using a transmission electron microscope (TEM) to examine the presence of the particles with voids and the proportion thereof. Specifically, the multilayer ceramic capacitor was polished to the center in the length (L) direction to expose the WT plane, and further processed to obtain a thin sample piece including the WT plane. The thin sample piece was observed using the TEM to obtain a high-angle annular dark-field (HAADF) image. In the observation, the cross section (WT plane) of the multilayer ceramic capacitor was divided into a side portion, an outer layer portion, and an inner layer portion, and the inner layer portion was further divided into an inner layer intermediate region and an inner layer side region. Then, the central portion of each of the inner layer intermediate region and the inner layer side region was observed in a visual field of about 1000 nm×about 1000 nm. The observation was performed on 100 or more dielectric particles. When 100 or more dielectric particles were not included in one visual field, a plurality of visual fields were connected and observation was performed.

Then, the number of dielectric particles (CN, WN) and the number of particles with voids in the dielectric particles (Cn, Wn) were counted for each of the inner layer intermediate region and the inner layer side regions, and the ratios (Cn/CN, Wn/WN) of number of the particles with voids were calculated. In addition, the pore sizes of a plurality of the particles with voids were measured, and the average value thereof was calculated.

Relative Permittivity

The electrostatic capacitance of the dielectric layer was measured using an automatic bridge type measuring machine. The measurement was performed on 100 samples under the conditions of a temperature of about 25° C., an effective voltage of about 0.5 Vrms, and a frequency of about 1 kHz. From the obtained electrostatic capacitance, the relative permittivity (Er) was calculated using the thickness of the dielectric layer and the area of the opposing electrodes, and the average value thereof was obtained. The samples were rated according to the following criteria based on the obtained values of the relative permittivity.

A: Relative permittivity of about 3000 or more and about 4800 or less

B: Relative permittivity of about 2500 or more and less than about 3000, or more than about 4800 and about 5000 or less C: Relative permittivity of less than about 2500 or more than about 5000

Capacitance Temperature Coefficient

The electrostatic capacitance of each of the five samples was measured in a temperature range of about −55° C. to about 105° C. under the conditions of an effective voltage of about 1 Vrms and a frequency of about 1 kHz, and the temperature coefficient (rate of change) of the electrostatic capacitance was calculated with reference to the value at about 25° C. The samples were rated according to the following criteria based on the obtained temperature coefficient values.

A: Absolute value of change rate at about 85° C. of about 10% or less

B: Absolute value of change rate at about 85° C. of more than about 10% and about 15% or less C: Absolute value of change rate at about 85° C. of more than about 15%

Reliability

A high temperature loading test (HALT) was performed on 20 samples under the conditions of a temperature of about 150° C. and an applied voltage of about 5 V. Then, the time until the insulation resistance value reached about 10,000Ω was obtained as the failure time, and the mean time to failure (MTTF) was calculated from the failure time by Weibull analysis. The samples were rated according to the following criteria based on the obtained MTTF values.

A: MTTF of about 80 hours or more

B: MTTF of about 60 hours or more and less than 80 hours

C: MTTF of less than about 60 hours

Evaluation Result

Figure 4:
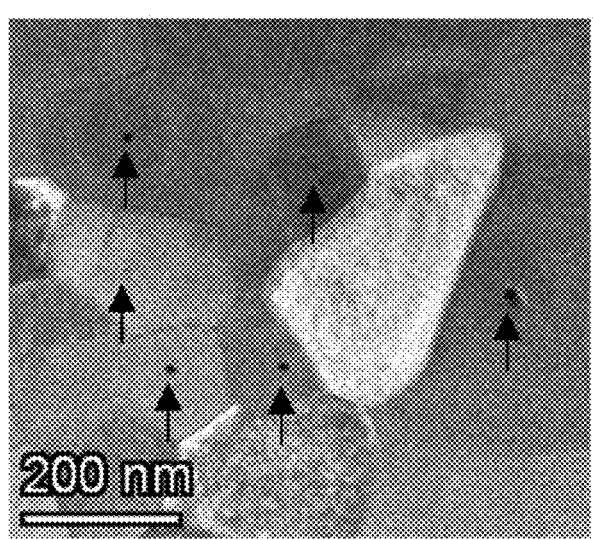
FIG. 4 is a TEM-HAADF image illustrating particles having voids.

A cross-sectional TEM-HAADF image obtained for the sample of Example 9 is shown in FIG. 4. The voids are present in the portions (black points) indicated by arrows in the figure. It was confirmed that some of the dielectric particles had voids inside the particles.

Table 1 shows evaluation results of the multilayer ceramic capacitors obtained in Comparative Examples 1 to 3 and Examples 1 to 20. As shown in Table 1, the samples of Examples 1 to 20 in which the dielectric layers of the inner layer portion contained the particles with voids had a high relative permittivity (Er), flattened capacitance temperature characteristics, and improved reliability (high temperature load life). The larger the ratio of number of the particles with voids, the more marked the advantageous effects obtained. In particular, the samples of Examples 8 to 12 and 17 to 20, in which the ratio of number of the particles with voids in the inner layer intermediate region was equal to or more than about 15%, the ratio of number of the particles with voids in the inner layer side regions was equal to or more than about 25%, the average pore size of the particles with voids was equal to or more than about 10 nm and equal to or less than about 30 nm, and the average particle size of the particles with voids was equal to or less than about 130 nm and equal to or less than about 300 nm, were excellent in any of the relative permittivity, the capacitance temperature characteristics, and the reliability. In contrast, the samples of Comparative Examples 1 to 3, which did not have the particles with voids, were insufficient in any of the relative permittivity, the capacitance temperature characteristics, and the reliability.

TABLE 1

| Characteristics of multilayer ceramic capacitor | | | | | | | |
| --- | --- | --- | --- | --- | --- | --- | --- |
| Ratio of number of particles with voids (%) | | Average pore size (nm) | Average particle size of dielectric particles (nm) | Thickness of dielectric layer (μm) | Temperature characteristics | Relative permittivity | Reliability |
| Inner layer intermediate region | Inner layer side region | | | | | | |
| Comparative example 1 | 0 | 0 | — | 133 | 0.45 | C | C | C |
| Comparative example 2 | 0 | 0 | — | 210 | 0.45 | C | A | C |

TABLE 1-continued

| | Ratio of number of particles with voids (%) | | | Average particle | Thickness | | | |
| | | | | | | | | |
| | Inner layer intermediate region | Inner layer side region | Average pore size (nm) | size of dielectric particles (nm) | of dielectric layer (μm) | Temperature characteristics | Relative permittivity | Reliability |
|---|---|---|---|---|---|---|---|---|
| Comparative example 3 | 0 | 0 | — | 295 | 0.45 | C | C | C |
| Example 1 | 3 | 0 | 10 | 290 | 0.45 | B | B | B |
| Example 2 | 3 | 6 | 12 | 280 | 0.45 | B | B | A |
| Example 3 | 15 | 24 | 17 | 120 | 0.45 | B | B | A |
| Example 4 | 16 | 23 | 17 | 130 | 0.45 | A | B | A |
| Example 5 | 15 | 22 | 17 | 220 | 0.45 | A | B | A |
| Example 6 | 15 | 20 | 17 | 300 | 0.45 | A | B | A |
| Example 7 | 15 | 19 | 17 | 310 | 0.45 | A | B | B |
| Example 8 | 15 | 25 | 10 | 210 | 0.45 | A | A | A |
| Example 9 | 15 | 25 | 17 | 210 | 0.40 | A | A | A |
| Example 10 | 15 | 25 | 17 | 210 | 0.45 | A | A | A |
| Example 11 | 15 | 25 | 17 | 210 | 0.50 | A | A | A |
| Example 12 | 15 | 25 | 30 | 210 | 0.45 | A | A | A |
| Example 13 | 15 | 25 | 9 | 280 | 0.45 | B | A | A |
| Example 14 | 15 | 25 | 31 | 130 | 0.45 | A | B | A |
| Example 15 | 12 | 25 | 10 | 210 | 0.45 | B | A | A |
| Example 16 | 12 | 25 | 30 | 210 | 0.45 | B | A | A |
| Example 17 | 19 | 22 | 13 | 280 | 0.45 | B | A | A |
| Example 18 | 31 | 32 | 24 | 220 | 0.45 | A | A | A |
| Example 19 | 36 | 40 | 26 | 180 | 0.45 | A | A | A |
| Example 20 | 42 | 44 | 30 | 130 | 0.45 | A | A | A |

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a first main surface and a second main surface opposite to each other in a thickness direction, a first side surface and a second side surface opposite to each other in a width direction, and a first end surface and a second end surface opposite to each other in a length direction, the multilayer body including a plurality of dielectric layers and a plurality of inner electrode layers laminated in the thickness direction; and a pair of outer electrodes provided on the first end surface and the second end surface and connected to the plurality of inner electrode layers; wherein the dielectric layers include dielectric particles;

the multilayer body includes:

a layered first side portion extending along the first side surface and not including an inner electrode layer;

a layered second side portion extending along the second side surface and not including an inner electrode layer;

a first outer layer portion sandwiched between the first side portion and the second side portion and sandwiched between the first main surface and an inner electrode layer closest to the first main surface among the plurality of inner electrode layers;

a second outer layer portion sandwiched between the first side portion and the second side portion and sandwiched between the second main surface and an inner electrode layer closest to the second main surface among the plurality of inner electrode layers; and an inner layer portion sandwiched between the first side portion and the second side portion and sandwiched between the first outer layer portion and the second outer layer portion;

in a cross section crossing a center or approximate center of the multilayer body in the length direction, a dielectric layer at a center or approximate center of the inner layer portion in the thickness direction includes particles including voids as the dielectric particles;

when a width of the multilayer body is defined as W, the inner layer portion includes:

a first inner layer side region in which a distance from an interface between the inner layer portion and the first side portion is equal to or less than about W/10 or equal to or less than about 40 μm;

a second inner layer side region in which a distance from an interface between the inner layer portion and the second side portion is equal to or less than about W/10 or equal to or less than about 40 μm; and an inner layer intermediate region sandwiched between the first inner layer side portion and the second inner layer side portion;

in the cross section, a dielectric layer at a center or approximate center in the thickness direction of the inner layer intermediate region includes the particles having voids as the dielectric particles;

in the cross section, a dielectric layer at a center or approximate center in the thickness direction of at least one of the first inner layer side region and the second inner layer side region includes the particles including voids as the dielectric particles; and in the cross section, a ratio of a number of the particles including voids among the dielectric particles at the center or approximate center in the thickness direction of at least one of the first inner layer side region and the second inner layer side region is larger than the ratio of the number of the particles including voids among the dielectric particles at a center or approximate center in the thickness direction of the inner layer intermediate region.

2. The multilayer ceramic capacitor according to claim 1, wherein in the cross section, the ratio of the number of the particles including voids among the dielectric particles at the center or approximate center in the thickness direction of the inner layer intermediate region is equal to or more than about 15%.

3. The multilayer ceramic capacitor according to claim 1, wherein, in the cross section, the ratio of the number of the particles including voids among the dielectric particles at the center or approximate center in the thickness direction of at least one of the first inner layer side region and the second inner layer side region is equal to or more than about 25%.

4. The multilayer ceramic capacitor according to claim 1, wherein an average pore size of the voids is equal to or more than about 10 nm and equal to or less than about 30 nm.

5. The multilayer ceramic capacitor according to claim 1, wherein the dielectric particles have an average particle size of equal to or more than about 130 nm and equal to or less than about 300 nm.

6. The multilayer ceramic capacitor according to claim 1, wherein the dielectric layer has a thickness of equal to or more than about 0.40 μm and equal to or less than about 0.50 μm.

7. The multilayer ceramic capacitor according to claim 1, wherein the dielectric layer has a thickness of equal to or more than about 0.40 μm and equal to or less than about 0.45 μm.

8. The multilayer ceramic capacitor according to claim 1, wherein the inner electrode layer has a thickness of equal to or more than about 0.30 μm and equal to or less than about 0.40 μm.

9. The multilayer ceramic capacitor according to claim 1, wherein the inner electrode layer has a thickness of equal to or more than about 0.30 μm and equal to or less than about 0.35 μm.

10. The multilayer ceramic capacitor according to claim 1, wherein the plurality of inner electrode layers include first inner electrode layers and the second inner electrode layers with rectangular or substantially rectangular opposing electrode portions opposite to each other and extended electrode portions extending to respective ones of the first end surface and the second end surface to be connected to the pair of outer electrodes.

11. The multilayer ceramic capacitor according to claim 1, wherein a total number of the plurality of dielectric layers included in the first outer layer portion, the second outer layer portion, and the inner layer portion is 100 or more and 2000 or less.

12. The multilayer ceramic capacitor according to claim 1, wherein the plurality of inner electrode layers include a conductive metal material and a ceramic component.

13. The multilayer ceramic capacitor according to claim 1, wherein a total number of the plurality of inner electrode layers is 100 or more and 2000 or less.

14. The multilayer ceramic capacitor according to claim 1, wherein tin is provided at an interface between the plurality of dielectric layers and the plurality of inner electrode layers.

15. The multilayer ceramic capacitor according to claim 1, wherein the pair of outer electrodes include a plating layer on a base electrode layer, with the base electrode layer including at least one of a baked layer, a resin layer, and a thin film layer.

* * * * *